United States Patent [19]

Durkin

[11] Patent Number: 4,986,705
[45] Date of Patent: Jan. 22, 1991

[54] STACKABLE FREIGHT CONTAINER FOR HOLDING STACKED CHASSIS

[75] Inventor: Robert O. Durkin, Arlington, Va.

[73] Assignee: EIS Corporation, Washington, D.C.

[21] Appl. No.: 125,617

[22] Filed: Nov. 25, 1987

[51] Int. Cl.⁵ .............................................. B60P 3/06
[52] U.S. Cl. ...................................... 410/57; 410/3; 410/46; 410/66
[58] Field of Search .................. 410/3, 31, 34, 35, 43, 410/46, 56, 57, 58, 66, 77, 78, 84, 94; 211/191, 195; 108/53.1, 53.5, 53.3, 55.1, 55.5; 220/1.5; 206/499, 511

[56] References Cited

U.S. PATENT DOCUMENTS

| | | |
|---|---|---|
| 3,004,682 | 10/1961 | Bertolini et al. ...................... 220/1.5 |
| 3,576,167 | 4/1971 | Macomber .......................... 410/58 X |
| 3,620,388 | 11/1971 | Mansson ............................. 410/3 X |
| 3,665,869 | 5/1972 | Howe ................................. 108/53.1 |
| 3,735,713 | 5/1973 | Glassmeyer ................... 108/55.1 X |
| 4,355,732 | 10/1982 | Nessfield ............................. 220/1.5 |
| 4,427,117 | 1/1984 | Matthewson et al. ............ 410/31 X |
| 4,611,962 | 9/1986 | Braly et al. ............................ 410/57 |
| 4,688,681 | 8/1987 | Bergeron ........................ 211/195 X |

FOREIGN PATENT DOCUMENTS

| | | | |
|---|---|---|---|
| 2030480 | 1/1972 | Fed. Rep. of Germany ..... 108/55.1 |
| 0586066 | 12/1977 | U.S.S.R. ............................... 220/1.5 |
| 1529431 | 10/1978 | United Kingdom .................. 410/66 |

Primary Examiner—George E. A. Halvosa
Assistant Examiner—Mark T. Le
Attorney, Agent, or Firm—Gipple & Hale

[57] ABSTRACT

The present invention is directed towards a special container for handling truck-trailer chassis and/or frames of truck-trailer chassis in overland transportation by rail, highway and marine transportation on board container ships. The container is capable of being stacked with other containers and is provided with front, intermediate and rear endframes, hinged at their base to a platform assembly so as to be rotated and stowed in a horizontal position when not in use, and when in use to be rotated to a perpendicular position to hold a stack of chassis of the same or different types and lengths, in place for shipping. The container is capable of being coupled together with other similar containers, forming an interlocked stack of containers which can be easily handled during overland and marine transportation.

1 Claim, 7 Drawing Sheets

STACKABLE FREIGHT CONTAINER FOR HOLDING STACKED CHASSIS

BACKGROUND OF THE INVENTION

The invention generally relates to the handling of freight in combined overland and marine transportation and is specifically directed to a freight container adapted to be mounted on railroad double-stack or flat cars, highway truck-trailer chassis and stowed aboard ship. Freight containers which are capable of being stacked in a superimposed relation are known in the prior art to fill the hold and increase deck storage of large sea going vessels. Examples of such containers are disclosed by U.S. Pat. Nos. 3,044,653 and 3,085,703. Containers of this type are provided with heavy steel castings at each of the four front and rear corners of the container. Each corner of the container is provided with a corner post connected between associated pairs of upper and lower steel castings which comprise load bearing members of the containers. Conventional openings in each of the steel castings facilitate the interlocking of the container with suitable lifting means for transferring the container from a land vehicle to a ship and vice versa, as well as to facilitate the positioning and securing together of containers in a stacked relationship. The corner castings are related to the corner post and to the top, side, and endwalls so that the container may be stacked on another with the full load taken by the corner castings and corner posts.

Another container for handling freight is shown by U.S. Pat. No. 3,646,609. This reference provides for the stacking of conventional containers of varied size in superimposed relation. The container is constructed with front and sidewalls formed by metal panels.

The applicant has developed another container for handling stacked chassis and this container is shown and described in U.S. Pat. No. 4,650,381.

The disclosed prior art containers necessitate the use of a three dimensional box shaped structure of continuous framing for purposes of handling freight. Since the freight is of substantial weight and size, it requires a box shaped container with a continuous floor base of sufficient strength and rigidity. The prior art container is a box shaped or platform structure for the conveyance of various commodities and is not a skeletal steel structure for the specific purpose of holding chassis as described by the present invention.

The conventional container chassis and chassis frame are of lengths greater than a standard size freight handling container frame and are of widths equal to that of the container frame. Thus the shipping and loading of a fully assembled container chassis or chassis frame is not easily accomplished unless the chassis are stacked and secured with special lashing gear, conveyed as special oversize cargo atop flat rack containers or within open top containers. The chassis frame is disassembled and packaged or otherwise shipped via a general cargo ship and not onboard a standard container ship, railway car or highway vehicle as containerized freight.

Container shipping companies have for some time been transporting containerized cargo overland atop railway cars (by TOFC and COFC), and more recently by doublestacked, specially dedicated railway cars. The economies provided to the shipper by double-stacked and COFC/TOFC service requires the shipping company to make considerable investment in purchasing and maintaining large fleets of chassis throughout its operating territories, at rail heads, depots and interchange points. This further involves repositioning of empty chassis by highways with resulting transportation costs exceeding that of rail transport.

Off-shore manufacturers of chassis have for some time been exporting chassis from their countries by general cargo (bulk) ships to the United States and other territories. Such shipment involves a freight charge, normally charged per cubic meter. For example, skeletal steel chassis frames shipped by general cargo vessel from Korea, landing on the west coast of the United States at prevailing favorable rates cost the buyer approximately U.S. $450/unit. Additional costs are involved for dockside handling, in-land transportation, cargo damage, etc. Moreover, if the chassis are shipped atop container flat racks or within open top containers as oversize cargo, the chassis will displace other revenue earning loads onboard container ships. Alternatively, chassis shipped within the confines of special high cube domestic containers, (e.g., 45 foot long, 102 inch wide containers) cannot be easily handled and would be limited to dedicated 45 ft./102 inch operations and would therefore displace other high revenue container freight loads. If chassis are not shipped fully assembled, additional work must be performed to complete assembly in the U.S. at U.S. labor rates. The largest market for chassis sales and demand for chassis vehicles is the east coast of the U.S., but the availability of general cargo ships for east coast discharge is limited, and transit times and freight rates are prohibitive.

By providing the means to quickly, easily transport chassis as containerized freight by railway, highway and onboard container ships, logistical problems are solved, investment in chassis vehicles can be reduced, economies of transportation costs can be realized, and the forementioned costs can be defrayed. The transportation company or container ship operator can reposition its chassis throughout the world as "non-revenue freight, company business."

SUMMARY OF THE INVENTION

The present invention generally relates to containers for chassis and skeletal steel frames of various overall lengths, designs and configurations.

Chassis manufacturing in the United States has traditionally been a regional sales oriented business because of the high cost of over-land freight to delivery points desired by buyers. In containerizing the chassis, the manufacturer and buyer can realize a cost savings by using more economical railway transport. For example, there is on average a 28% savings in transport using COFC rail from the west coast to east coast vs line-haul by tractor.

For the fleet operator of chassis, the present invention provides the ability to reposition their chassis throughout the territory or overseas as containerized freight. When container loads of freight are shipped by rail, particularly by double-stack rail cars, chassis are needed at both origin and destination points of the rail link. It is more convenient and economical to move a containerized load of stacked chassis together with the rail cars transporting container freight, rather than alternatively providing large equipment pools of chassis distributed throughout the rail shipping network.

Container chassis have been produced in various overall lengths, as for example: 20 ft., 35 ft. and 40 ft. The chassis then have a different length wheel base and some have a translating frame section of the chassis skeletal steel frame providing for varying both wheel base and overall length, as for example: a 40 ft. chassis sliding to a 45 ft. position. Moreover, chassis are known to be of different designs and configurations, as for example: a 40 ft. gooseneck chassis with twistlocks, a 40 ft. chassis with intermediate clamping bolster assemblies, a chassis with or without front bolster or rear bolster assemblies. The foremenetioned variety of chassis conditions makes the superimposed stacking and joint shipment of chassis a task which is not easily accomplished. The present invention provides a simple convenient method to transport in stack a plurality of chassis of different types, requiring no special handling equipment or lashing gear.

If chassis accompany individual containers atop railway flat cars as in TOFC service, the economies of consolidated double-stacked rail car shipment cannot be realized. Similarly, if a box type container was used to transport chassis, the repositioning of the empty box type container would displace revenue earning loads and each lift of an empty container costs the shipper money.

Therefore, it is clearly economical and desirable to use a special container for transporting stacked chassis, and providing the ability to also stack the empty containers in a consolidated, reduced height, so that a plurality of empty containers can be moved as one.

While the invention specifically relates to a conventional forty foot container and chassis, it is to be understood that any specific container of chassis length, as for example, two twenty foot chassis in place of one forty foot chassis, or a forty-five foot container could be easily adapted for shipment as containerized freight.

The corner support points and any intermediate support points of the container in the present invention are sufficiently strong to support a plurality of containers in superimposed relation. Conventional openings are provided in each of the support points to facilitate the locking and lifting of the container with conventional lifting means and for transferring the container.

The containers of the invention are capable of transporting stacks of chassis where the container for transport is itself capable of being stacked interchangeably in various loading arrangements with other containers of equal, greater or shorter length. The corner support points or any intermediate support points coincide with the corner supports of other containers of equal length. In this manner the load path for a stacked series of containers may be either at the end corner support points or any intermediate support points depending upon the respective length of stacked containers. Since a stack of containers would have a common load path, a conventional spreader mechanism, such as that disclosed by U.S. Pat. No. 3,042,227, which has relatively fixed pick up points and is designed for lifting the shortest or longest containers in a prescribed container stack, can be utilized for transferring, stacking or unstacking single or mixed length containers.

The present invention provides a stack of container chassis which are restrained by the framing members of the container and does not require lashing gear to secure the chassis. The invention is capable of being hoisted between land vehicles and marine vessels by existing transferring apparatus and lifting systems and is capable of being stacked in engaged superimposed relationship on one another.

One feature of the invention is the use of folding front, rear and intermediate endframes to restrain the chassis from movement when endframes are locked in a vertically upright position. The endframes may be rotated about hinge points and folded downwards to a horizontal position and stowed when not in use to facilitate the stacking of similar special containers. The overall height of the container is thus reduced significantly, allowing a plurality of similar containers to be stacked and engaged in a locked bundle, having a size equal to other standard box shape containers, capable of being hoisted and transferred as one group, saving handling charges and other revenue earning container slots on railway cars, highway vehicles and marine vessels.

Another feature of the invention is the continuously framed opening at the front, intermediate and rear end frames which makes use of the container chassis skeletal steel frame to restrain the chassis from movement. Moreover, the endframes are spaced at a convenient width, greater than the chassis frame width, typically 40 inches, and are provided with gathering features at their top ends, to allow for the quick and convenient placement of chassis atop the container.

Another feature of the invention is the use of retractable twistlock assemblies, such as those manufactured and sold by Gerd Schulz Co., Hamburg, W. Germany. Retractable twistlocks positioned at the top corners of the platform end posts can be utilized to both lock the endframe in the upright position, and to engage and couple other similar containers when stacked in superimposed relation.

Yet another feature of the invention is the use of hinge points at the base of the front, intermediate and rear endframes, so that the endframes can be rotated about their hinge points and stowed in a horizontal position when not in use to hold stacked chassis. Thus the overall height of the special container can be substantially reduced, allowing a plurality of similar containers to be stacked one atop another, engaged in superimposed relation, thereby being hoisted and transported as one.

Still another feature of the invention is the provision of a transverse restraining member fixed to the chassis mainframe, such as a generator set mounting beam or other suitable means, so that the skeletal steel frame of the chassis can be restrained from forward or rear translation in transport.

Yet another feature of the invention is the provision of fork lift pockets located transversely across the platform frame of the container, so that the empty or loaded container can be handled by forklift means, thus not requiring top lifting by a top loader, spreader mechanism or other conventional container lifting means.

Another feature of the invention is the use of conventional container chassis rear twistlock devices and front pin locking devices to facilitate the stacking and engagement of the container atop a common container chassis when transported overland by highway.

Yet another feature of the invention is the provision of top and bottom corner castings located at the upper, lower, and stacked height of the front and rear endframes, thereby allowing for hoisting by conventional container lifting means, engagement with other containers by conventional securement devices such as locking stackers, or securement aboard vessels by conventional lashing gear.

Still another feature of the invention is the provision of front and rear endframes having support points at the four corners, top and bottom of the container endframes, for alignment with support points of a container with substantially equal length and/or intermediate support points at the top or bottom of container endframes spaced sufficiently to align with support points of a container of shorter or greater length so as to be releasably secured thereto in stacked relationship.

While this invention relates specifically to the handling of container chassis in successive overland and marine transportation, it is to be understood that many other types of commodities could be equally well adapted for stacking and/or transport, as for example the truck-trailers disclosed in the foregoing, pressure vessels or other fabricated structural steel members or apparatus.

These and other objects and advantages of the present invention will be more fully appreciated by reference to the following discussion of the invention when read in conjunction with the accompanying drawings.

DETAILED DESCRIPTION OF THE INVENTION

The preferred embodiment and best mode of the invention is shown in FIGS. 1 to 8. Unlike prior art containers the chassis 50 are in fact the freight to be handled, thereby framing and forming a cargo container for transporting cargo on container ships, on a truck-trailer chassis ("container chassis"), railway flatcars, etc. The container chassis frames are well known in the art and available for purchase from Fruehauf U.S.A., Trailmobile, a division of the Pullman Company, Strick Corporation and Dorsey Corporation to name a few manufacturers. Therefore, construction of the chassis frames need not be specifically described in this specification.

Since chassis and containers have specifications for certain design and dimensional criteria promulgated by I.S.O., A.N.S.I., A.A.R. and other organizations, the invention makes use of common features of the chassis to stack and restrain the chassis from movement within the framing of the special container. The common chassis features are: (1) skeletal frame width of 40 inches, (2) a raised gooseneck beam section $4\frac{3}{4}$ inches above the main frame beams, (3) landing gear legs separated a standard width at centers set by A.A.R., (4) standard wheel track of $71\frac{1}{2}$ inches, and (5) most often front and rear bolster assemblies of box shaped steel construction. While in transport the chassis must be restrained so as to prevent free movement towards the front and rear of the container, and restrained to resist any over turning moments that would otherwise cause the chassis to topple over towards the left or right hand side.

Prior to placing the chassis in the container endframes 30 and 40 are rotated upward into a perpendicular position and locked into position. The intermediate endframes 90 are rotated upwards into a perpendicular position in regard to the platform frame and are locked into position in the same manner as end frames 30 and 40. By positioning the chassis in between end frame posts 39 and intermediate end frames 90, the chassis rear bolster assemblies 52 can be utilized to restrain chassis from movement towards the front or rear. Similarly, a restraining member 56, for example a chassis generator set mounting beam, or other suitable means fastened transversely across the skeletal steel frame, projecting outwards from the plane of the main beam web is used to restrain movement. The member located at some convenient point between the landing gear and running gear, can be utilized to restrain the chassis from movement towards the front or rear.

Chassis 50 generally use beams for their main frames which are about 12 inches deep, and set at any overall width of 40 inches maximum. The landing gear legs 57 of the chassis are joined transversely across the width of the frame 50 by a steel cross member 59. By installing a steel member of sufficient strength, the landing gear legs and their cross member can be utilized to support the vertical load imposed by a chassis on the container or chassis immediately beneath in the stack. The left side and right side tires are spaced at a width slightly wider than the skeletal steel frame. By positioning the running gear of a stacked chassis atop the raised gooseneck beam section of chassis below, the tires and axle assemblies can be used to stabilize the load and further restrain the chassis from movement towards the left or right and side. The endframes at the front and rear, numbered 30 and 40 respectively, and the intermediate endframes 90 are constructed to define an open framed center section of a width greater than the 40 inch main frame width of the chassis and are utilized to restrain chassis from movement to either side or to resist over turning moments.

In the drawings, the numeral 30 designates generally a front endframe assembly of the container and the numeral 40 designates generally a rear endframe assembly of the container rotatably mounted to a platform frame 60.

A pair of intermediate endframes 90 are rotatably mounted to the platform frame 60 in the same manner as the endframes 30 and 40. The platform frame 60 comprises a plurality of outer and inner linear beam members 61 with end beams 62 and cross support members 63. One end of the platform frame is provided with a wheel well structure 64 comprising a trapezoidal shaped center member 65 and two opposing inclined members 66 on each side of the trapezoidal member. The wheel well forms a seat for the chassis tires when the chassis are stacked on each other. Both end frame assemblies 30 and 40 comprise a pair of end posts ("corner posts") 39, interconnected by sills 34 and header bars 35 connected to the end posts by tail beams 36. The header bars 35 may be fixed securely by welding or other suitable means and define the open framed center section of the end frame. The front end frame assembly 30 and rear end frame assembly 40 engage the front and rear bolster assembles 53 and 52 of the chassis 50. The intermediate end frames 90 engage the chassis restraining member 56.

The front end frame assembly 30 and rear end frame assembly 40 are connected to a base platform frame 60 and are hinged about their base points by pins 38 or other suitable means so as to be rotated and stowed in a horizontal position when not in use. Unlike prior art box shaped containers, the chassis 50 are in fact the freight to be handled, restrained from movement by end frames 30, 40, intermediate end frames 90, and a restraining member 56 fixed to the chassis 50 main frame, thereby allowing for transporting the cargo on container ships, on truck-trailer chassis 50, railway flat cars 80, and stacking in superimposed relation atop other containers 70.

Figure 1:
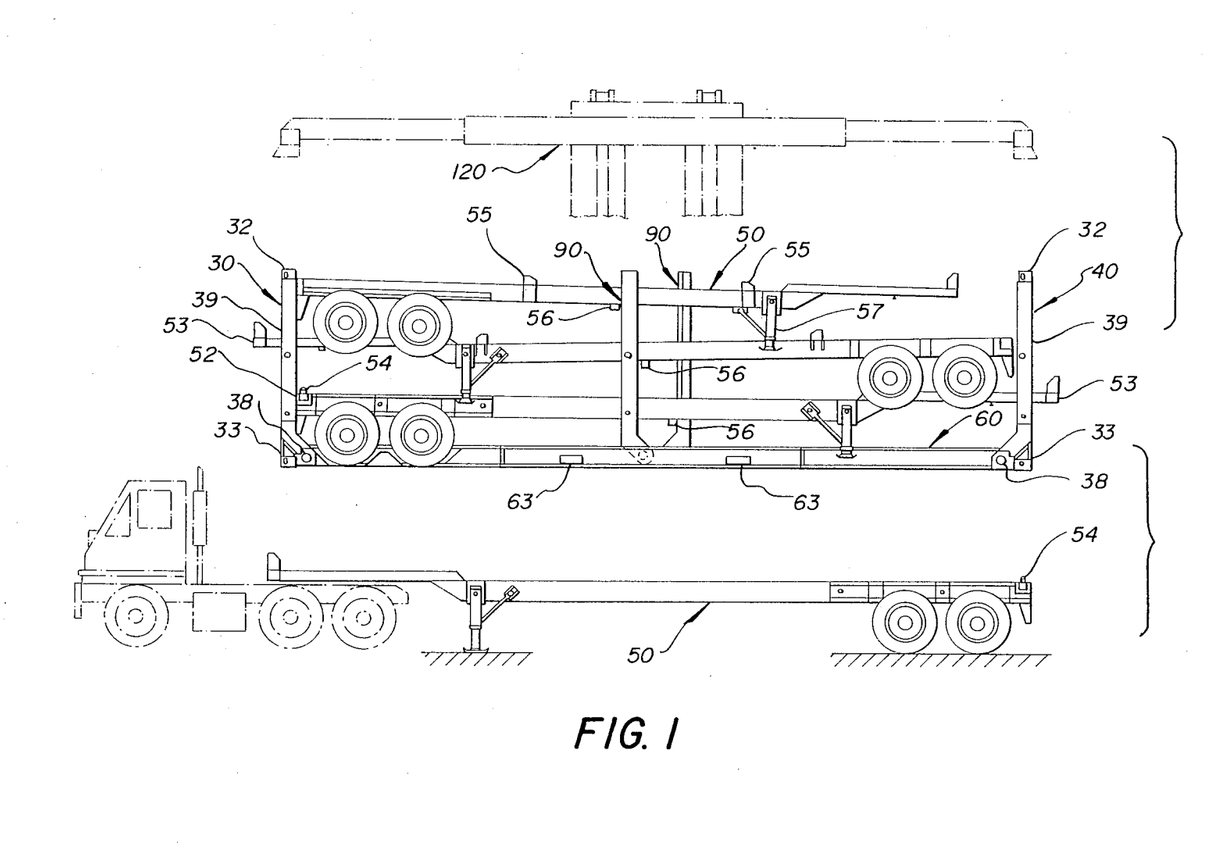
FIG. 1 is an exploded side elevation view of the elongated container for handling chassis or chassis frames, and illustrates the stacking and loading of the container atop a truck-trailer chassis with a truck cab and top loader shown in phantom.
Figure 2:
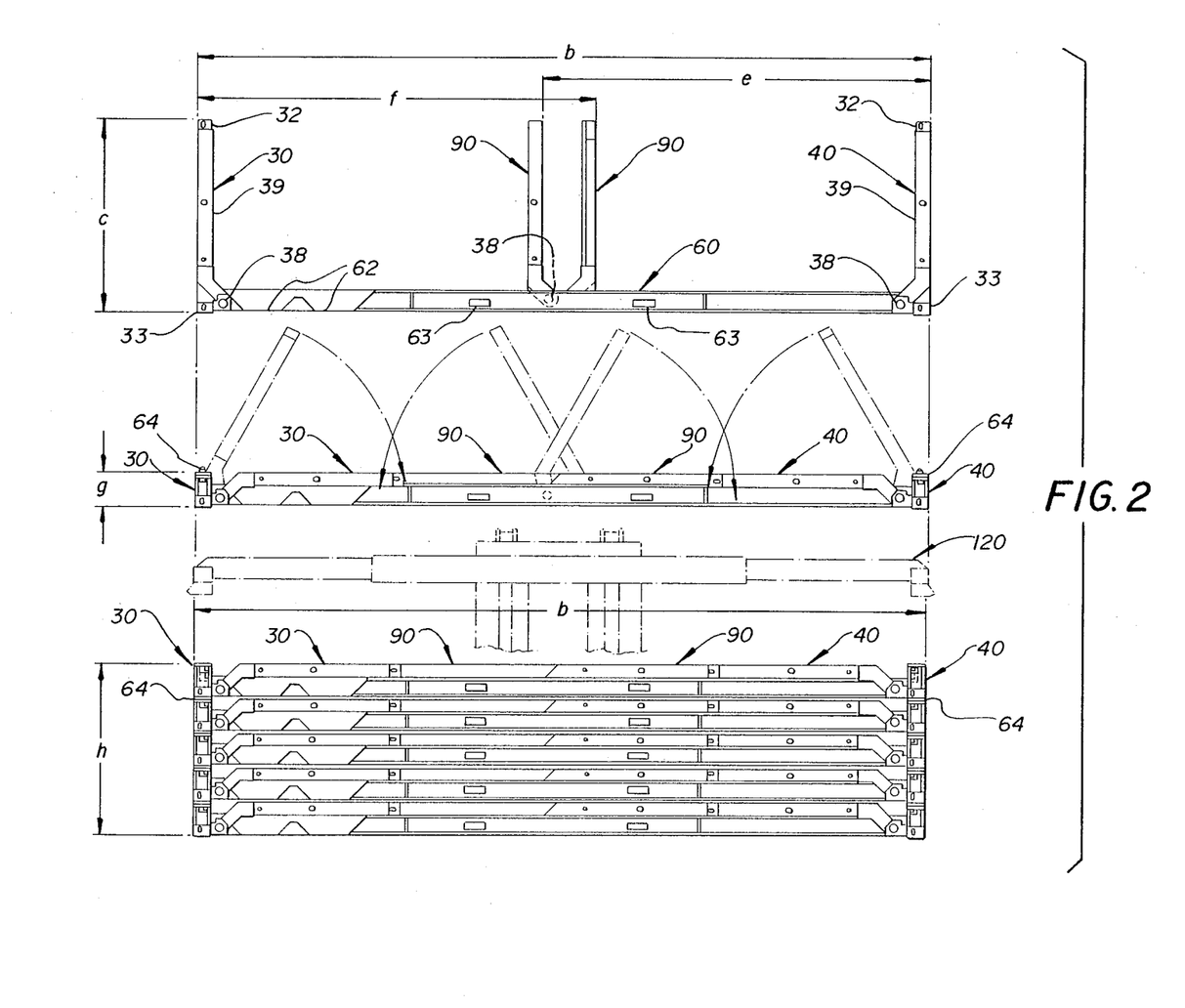
FIG. 2 is a side elevation view of the elongated containers in a stacked relationship.
Figure 3:
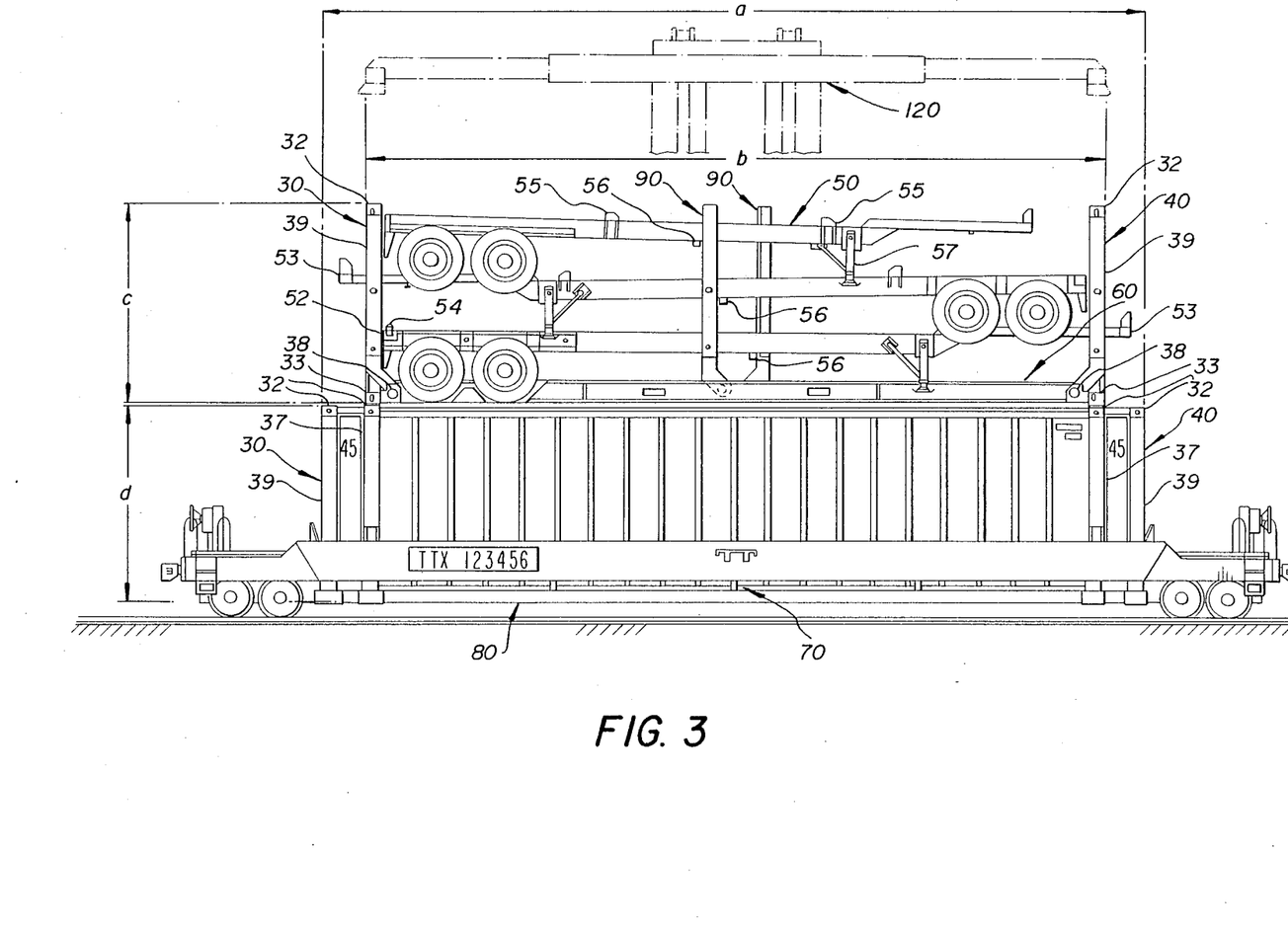
FIG. 3 is a side elevation view of a container with endframes in a horizontal stowed position also showing the endframes partially raised in phantom.
Figure 4:
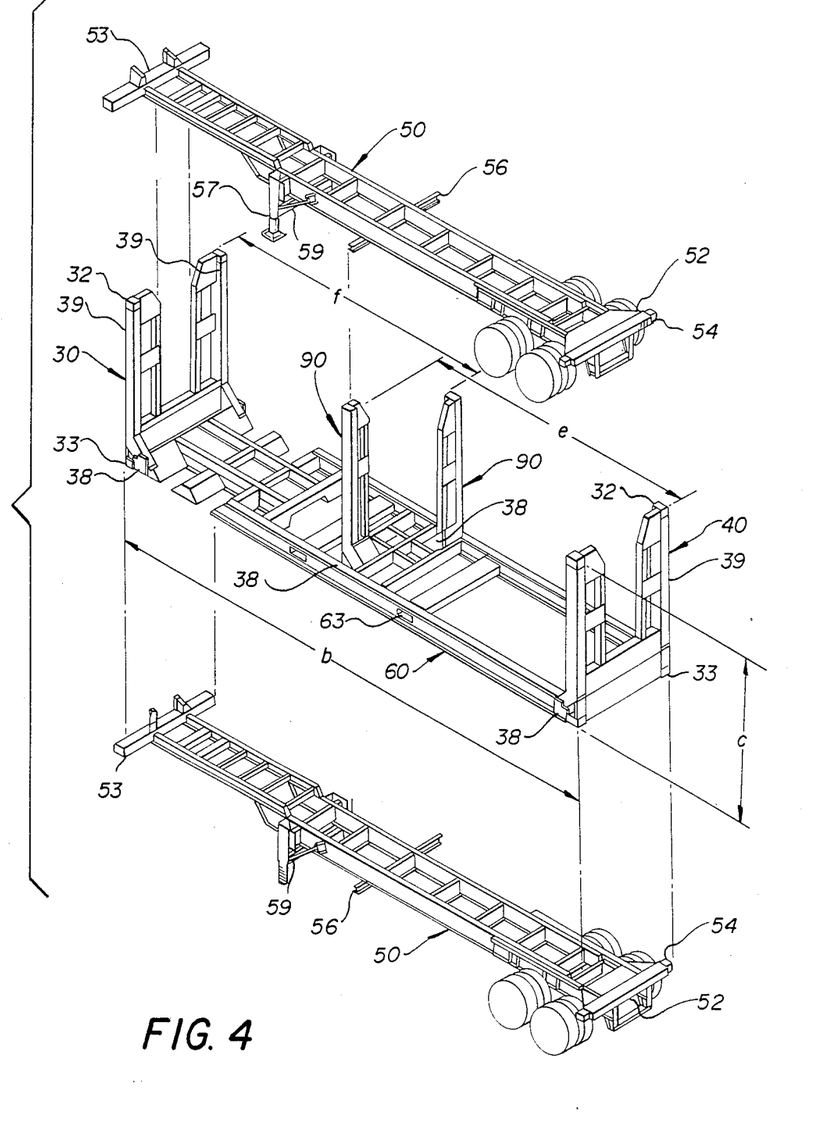
FIG. 4 is a side elevation view of the container shown in FIG. 3 with the front, rear and intermediate endframes in an upright locked position to hold chassis.
Figure 5:
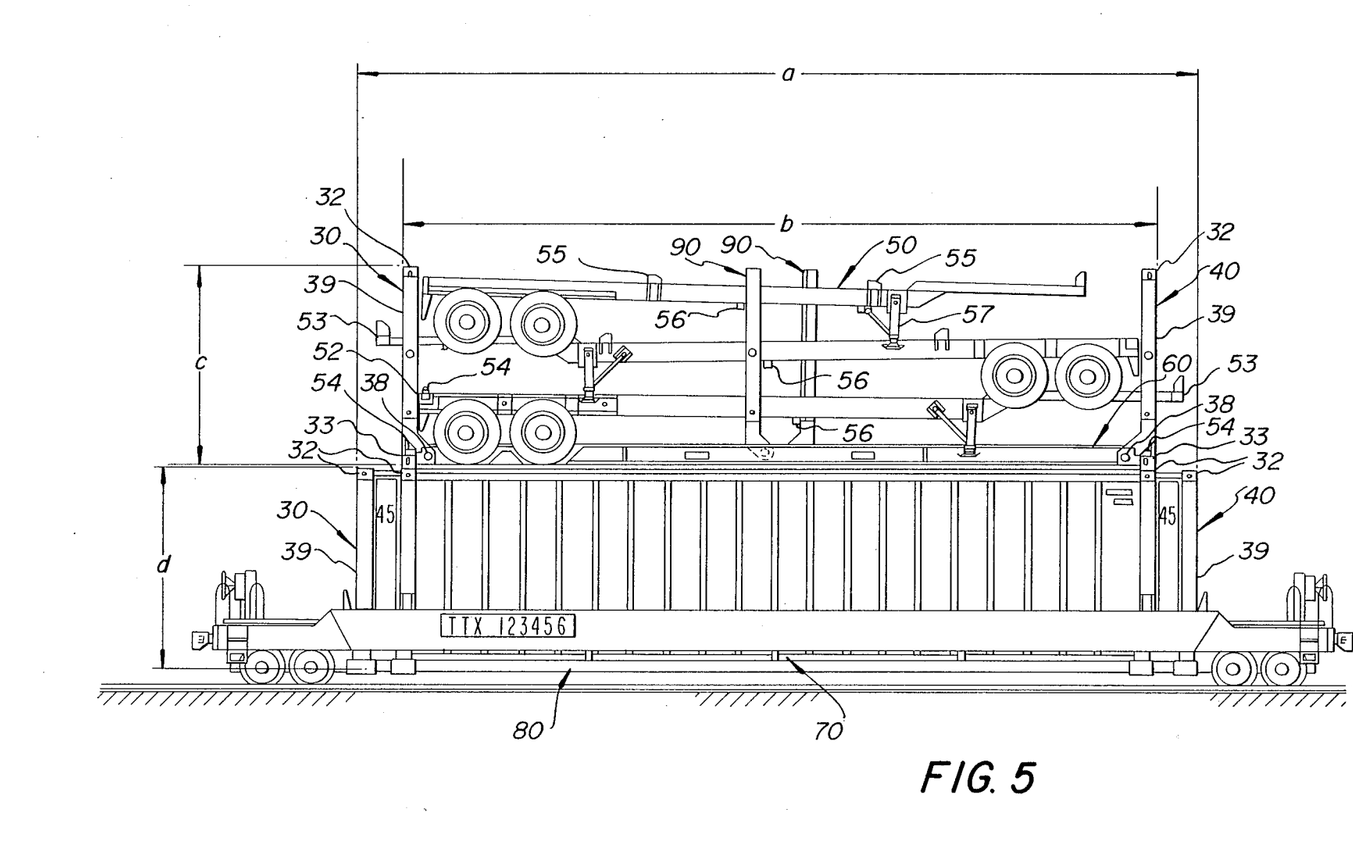
FIG. 5 is a side elevation view of the elongated container for handling chassis, illustrating the stacking of the container atop another freight container on a railway double-stacked vehicle.
Figure 6:
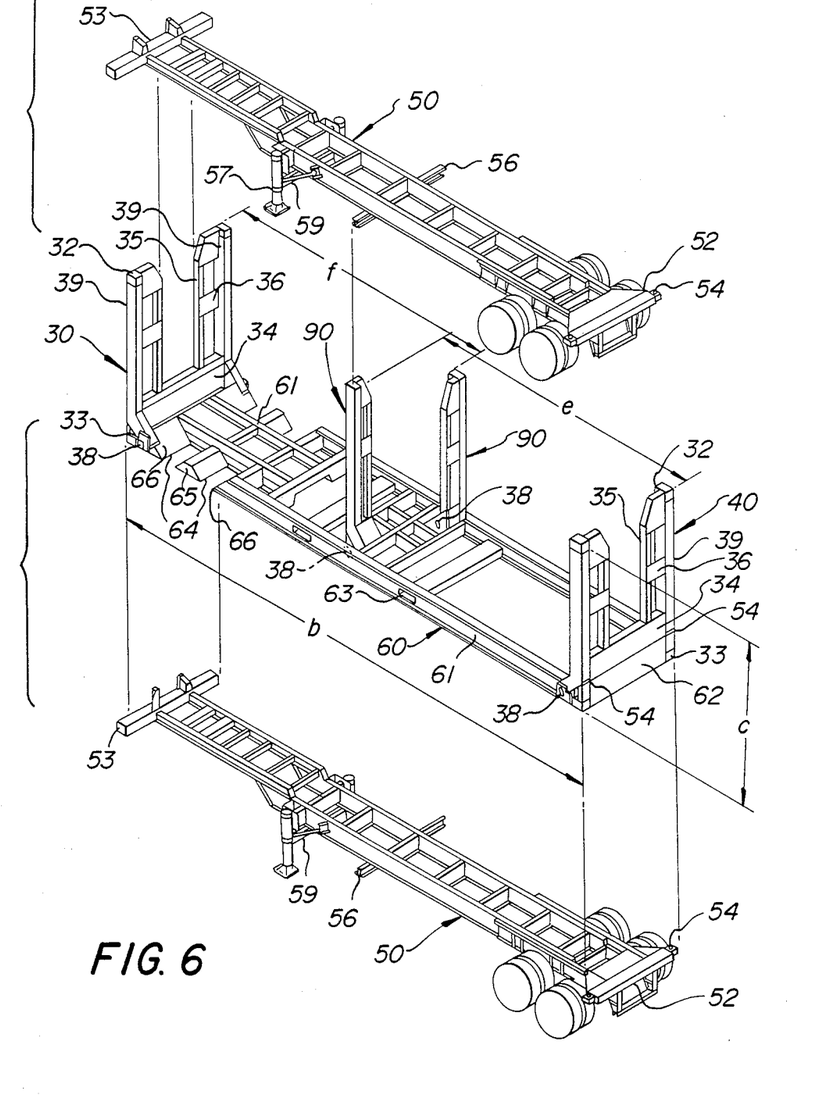
FIG. 6 is an isometric, exploded perspective view of the container illustrating the stacking of chassis atop the container, restrained by the endframes and chassis transverse restraining member, and further depicting the positioning of the container atop a truck-trailer chassis.

The chassis frame 50 may be connected to front and rear end frames 30 and 40, making use of the conventional retractable twistlock assemblies 54 and front chassis pin assemblies to secure the chassis rear bolster 52 and front bolster 53 to the end frames 30 and 40. Retractable twistlocks positioned at the top corners of platform end posts 39 can be utilized to both lock the end frame in the upright position as seen in FIG. 2 and to engage and couple other similar containers 60 when stacked in superimposed relationship as also seen in FIG. 2. Conventional means known in the art to accomplish such securing are shown in U.S. Pat. Nos. 4,486,132 and 4,459,072. The chassis front 53 and rear 52 bolster assemblies are of sufficient strength so as to provide the necessary transverse rigidity, lateral stability and longitudinal restraint to frame the container. Preferably the chassis rear twistlock assembly and chassis front pin assembly are removably secured to the front and rear bolster assembly so that they can be added or removed as desired. The use of the keys and keyways can be used to accomplish this selective connection. U.S. Pat. No. 4,650,381 issued Mar. 17, 1987 is hereby incorporated by reference into the specification of this application.

Figure 7:
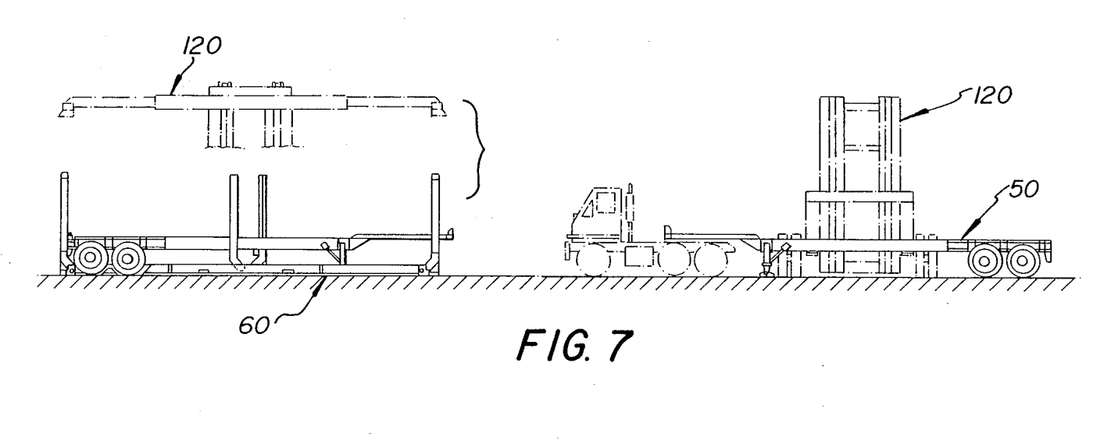
FIG. 7 is a side elevation view of the chassis with front loader in phantom when lifted off of a container and placed on a trailer.
Figure 8:
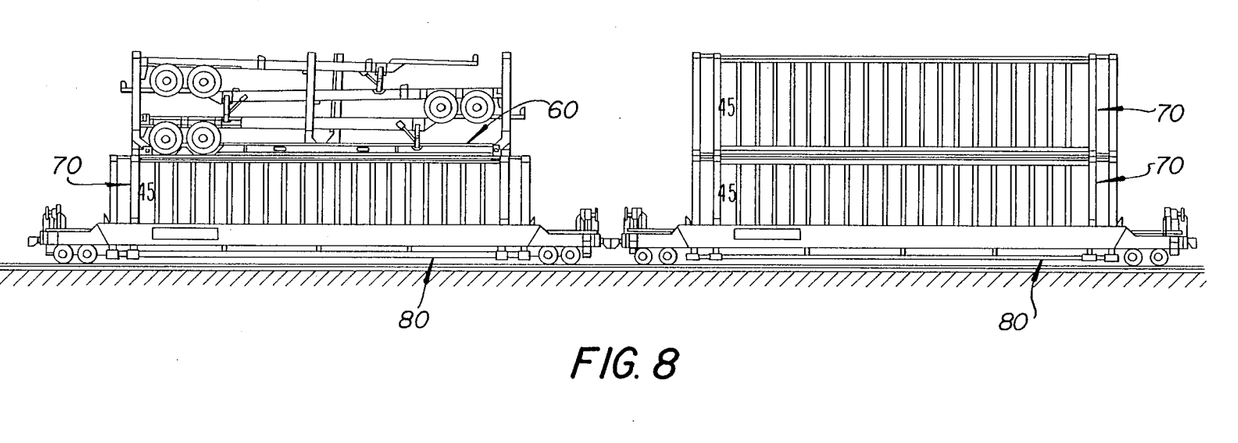
FIG. 8 is a side elevation view of the chassis and containers holding the chassis on rail cars.

In order to support the weight of a plurality of superimposed containers and to transfer that load to the corner post of the container beneath or other support on board ship, railcar or the like, cornerposts 39 and corner castings 32 and 33 are provided, similar to those disclosed in U.S. Pat. Nos. 3,042,227, 3,085,70, 3,044,653 and 4,650,381. Each of the cornerposts 39 have upper corner castings 32 and lower corner castings 33 welded or otherwise suitably attached thereto at each end, and are of sufficient strength to support the load imposed by the freight and simultaneously to support a plurality of containers thereabove. Each of the top corner castings 32 and bottom corner castings 33 has an oblong slot opening or socket defined therein of a conventional shape and size as regulated by the International Standards Organization formed to receive a conventional coupling mechanism, not shown but well known in the art, for lifting the container by spreader bar or slings. The top and bottom castings are also used to secure the container to deck sockets on board ships, to adjacent containers above or below, and atop railway flatcars. The chassis 50 and containers 60 can be lifted from the stacked alignment by top loader 120 as is shown in FIGS. 2 and 7.

It should be understood that the apparatus described above is not intended to limit the invention in any manner, nor is the invention limited to any one embodiment described. On the contrary, the invention is viewed as encompassing all alternatives, modifications and equivalents as may be included within the spirit and scope of the invention as defined by the following claims.

What I claim is:

1. Freight-handling apparatus comprising in combination a body for stacking interchangeably in superimposed relationship with other bodies and chassis of the same or differing lengths, each said chassis comprising a main frame with parallel side beams and a rear bolster means secured to said side beams, wheel means mounted on one end of said main frame, landing gear legs mounted on the other end of said main frame, a chassis support beam mounted transverse to said main frame and extending past the sides of said parallel side beams of said main frame, said chassis support beam being located between said landing gear legs and said wheel means and a gooseneck beam assembly secured on one end to said main frame above the said parallel beams, a front bolster means secured to the other end of said gooseneck beam assembly, said stacking body comprising a support frame, front and rear endframes rotatably mounted to said support frame, an independent intermediate frame assembly rotatably mounted to said support frame and positioned between said front and rear endframes, said front and rear endframes and intermediate frame assembly being adapted to be raised upward to assume a substantially perpendicular position with respect to a plane defined by the support frame to hold chassis thereon and restrain said chassis from movement, said endframes when not used to hold chassis being adapted to be positioned in a horizontal position in relation to said plane of the support frame.

* * * * *